US008822028B2

(12) United States Patent
Song et al.

(10) Patent No.: US 8,822,028 B2
(45) Date of Patent: Sep. 2, 2014

(54) ACRYLIC PRESSURE SENSITIVE ADHESIVE AND METHOD OF PREPARING THE SAME

(75) Inventors: Kong-ju Song, Daejeon (KR); Young-min Kim, Daejeon (KR); Chang-bum Ko, Daejeon (KR); Kum-hyoung Lee, Daejeon (KR)

(73) Assignee: LG Chem, Ltd. (KR)

( * ) Notice: Subject to any disclaimer, the term of this patent is extended or adjusted under 35 U.S.C. 154(b) by 354 days.

(21) Appl. No.: 12/831,375

(22) Filed: Jul. 7, 2010

(65) Prior Publication Data

US 2011/0014465 A1 Jan. 20, 2011

(30) Foreign Application Priority Data

Jul. 16, 2009 (KR) .......................... 10-2009-0064869

(51) Int. Cl.
C09J 133/04 (2006.01)
C09J 133/06 (2006.01)
C09J 133/08 (2006.01)
C09J 133/18 (2006.01)
C09J 133/20 (2006.01)
C08F 236/02 (2006.01)
C08F 236/20 (2006.01)
C09J 4/00 (2006.01)
C09J 7/02 (2006.01)

(52) U.S. Cl.
CPC C09J 7/0217 (2013.01); C09J 4/00 (2013.01); C09J 2201/606 (2013.01); C09J 133/08 (2013.01)
USPC ............... 428/355 AC; 526/312; 526/319; 526/323.1; 526/324; 526/325; 526/329.6; 526/341; 526/320; 524/560; 524/565; 524/612; 524/850

(58) Field of Classification Search
USPC ............. 428/355 AC; 526/319, 323.1, 323.2, 526/320, 341, 324, 325, 329.6, 312; 524/560, 565, 612, 850
See application file for complete search history.

(56) References Cited

U.S. PATENT DOCUMENTS

| | | | |
|---|---|---|---|
| 3,959,219 A | | 5/1976 | Aoyama et al. |
| 4,913,960 A | * | 4/1990 | Kuroda et al. ............... 428/345 |
| 4,925,908 A | * | 5/1990 | Bernard et al. ............... 526/320 |
| 5,013,784 A | * | 5/1991 | Yang ............................ 524/458 |
| 5,180,787 A | | 1/1993 | Shorr et al. |
| 5,240,989 A | | 8/1993 | Bernard et al. |
| 6,521,695 B1 | * | 2/2003 | Peruzzotti et al. ............ 524/505 |
| 6,586,510 B1 | | 7/2003 | Brown et al. |
| 2006/0036027 A1 | | 2/2006 | Chen et al. |
| 2012/0071053 A1 | * | 3/2012 | Ko et al. ....................... 442/151 |

FOREIGN PATENT DOCUMENTS

| | | | |
|---|---|---|---|
| JP | 2005008830 A | * | 1/2005 |
| KR | 19950010649 B1 | | 2/1999 |
| WO | 02074853 A1 | | 9/2002 |

OTHER PUBLICATIONS

JP 2005008830 A, machine translation, Kobayashi, Jan. 2005.*
Office Action from China Application No. 201010221453.9, dated Jan. 31, 2012.
"Study of Synthesis of Quaternary Copolymerization Acrylate Hot-Melt Pressure Sensitive Adhesive Film", Wenbu Li, et al., China Adhesives, vol. 15, No. 9,6-10, Sep. 30, 2006.

* cited by examiner

*Primary Examiner* — Satya Sastri
(74) *Attorney, Agent, or Firm* — Lerner, David, Littenberg, Krumholz & Mentlik, LLP

(57) ABSTRACT

Provided is a removable acrylic pressure sensitive adhesive comprising (A) 70-96.5 weight % of (meth)acrylic acid ester monomer having $C_1$-$C_{14}$ alkyl group; (B) 0.5-27 weight % of one or more functional group containing monomers selected from the group consisting of carboxyl group containing monomer, hydroxyl group containing monomer, epoxy group containing monomer, vinyl ester group containing monomer and cyano group containing monomer; and (C) 0.6-3 weight % of a cross linking agent having 5-13 alkylene oxide groups and acrylate group or vinyl group in 100 weight % of the monomers and the cross linking agent, and the adhesive of the present invention is a water based adhesive and pro-environmental, and demonstrates excellent adhesiveness at room temperature and under aging atmosphere and excellent dimensional stability as well, so that it can be widely used for various pressure sensitive adhesive sheets for outdoor/indoor advertisement, automobile, printing, decorating, etc.

13 Claims, No Drawings

ACRYLIC PRESSURE SENSITIVE ADHESIVE AND METHOD OF PREPARING THE SAME

CROSS-REFERENCE(S) TO RELATED APPLICATION

This application claims priority from Korean Patent Application No. 10-2009-0064869 filed on Jul. 16, 2009, in the Korean Intellectual Property Office, the disclosure of which is incorporated herein by reference in its entirety.

TECHNICAL FIELD

The present invention relates to a removable acrylic pressure sensitive adhesive and a method of preparing the same, and more particularly, to a removable acrylic pressure sensitive adhesive that is a kind of pro-environmental water based adhesive, which has excellent adhesiveness at room temperature and under aging atmosphere, and dimensional stability together with a high level of permanent adhesive-like adhesiveness and excellent removability, so that it can be widely used for various pressure sensitive adhesive sheets for outdoor/indoor advertisement, automobile, printing, decorating, etc.

BACKGROUND OF THE INVENTION

A removable adhesive is an adhesive that can be easily removed without leaving stains or debris from a substrate where it has been adhered.

The pressure sensitive adhesive sheet applied to the removable adhesive on one side of the substrate can be printed by graphic printing of the substrate using inkjet printer or airbrush printer and then used for POP display, plane advertisement on bus or taxi or automobile wrapping or advertisement on window or floor.

Such pressure sensitive adhesive sheet is used not only indoor but also outdoor, so it needs to be designed to have low glass transition temperature (Tg, at least −40° C.) in order to demonstrate satisfactory workability and adhesiveness at low temperature. Considering the surface where it is used, that is it can be adhered on irregular surface or indented surface, and considering the duration, for example, it might needs to be adhered for months or 2 years at most, the adhesive for such pressure sensitive adhesive sheet needs to have excellent adhesive power, dimensional stability to maintain the original size of the pressure sensitive adhesive sheet, and weatherability so as to maintain its physical properties for a long term.

Particularly, it is very important for a removable adhesive to have excellent removability without leaving residues after being adhered once. In most cases, when removability and dimensional stability are increased, adhesive power is decreased. So, it is generally understood that a removable adhesive has weaker adhesive power than a permanent adhesive leaving residues when it is removed.

To increase physical properties of a removable adhesive, it is necessary to regulate the molecular structure such as compositions, cross-linking density, molecular weight and molecular weight distribution of the adhesive. For example, when a cross-linking agent is properly regulated, removability of a removable adhesive can be adjusted.

U.S. Pat. No. 5,240,989 describes a removable acrylic pressure sensitive adhesive having glass transition temperature (Tg) of −50-−55° C. prepared by using a multifunctional diacrylate cross-linking agent having different functional groups including hexanedioldiacrylate. According to this description, a proper amount of gel is necessarily included in the resin in order for the adhesive to have removability. At this time, the preferable content of such cross-linking agent is 0.1-0.3 weight part, according to the patent.

U.S. Pat. No. 6,586,510 describes an acrylic pressure sensitive adhesive with modified removability prepared by using a multifunctional cross-linking monomer such as allylmethacrylate, diallylmalate or ethylene glycol diacrylate at the concentration of 0.01-1 weight part.

US Patent Publication No. 2006-0036027 (2006.02.16.) describes a removable adhesive having strong resistance against a plasticizer prepared by using a cross-linking agent such as diallylmalate, allylacrylate or allylmethacrylate at the concentration of 0.3-0.6 weight part.

However, the mentioned prior arts cannot provide satisfactory removability and adhesiveness at room temperature and under aging.

SUMMARY OF TEE INVENTION

An embodiment of the present invention is directed to providing a removable acrylic pressure sensitive adhesive which is a pro-environmental water based adhesive having excellent dimensional stability and adhesiveness at room temperature and under aging condition and as high adhesive power as a permanent adhesive and at the same time excellent removability, so as to be widely used for pressure sensitive adhesive sheets for outdoor/indoor advertisement, automobile, printing, decorating, etc, and a method of preparing the same.

To achieve the aspect of the present invention, the present invention provides a removable acrylic pressure sensitive adhesive comprising:

(A) 70-96.5 weight % of (meth)acrylic acid ester monomer having $C_1$-$C_{14}$ alkyl group;

(B) 0.5-27 weight % of one or more functional group containing monomers selected from the group consisting of carboxyl group containing monomer, hydroxyl group containing monomer, epoxy group containing monomer, vinyl ester group containing monomer and cyano group containing monomer; and (C) 0.6-3 weight % of a cross linking agent having 5-13 alkylene oxide groups and acrylate group or vinyl group in 100 weight % of the monomers and the cross linking agent, and a method of preparing the same.

DETAILED DESCRIPTION

Hereinafter, the present invention is described in detail.

The present inventors completed this invention by confirming that a removable acrylic emulsion adhesive having excellent adhesiveness, dimensional stability and removability (without leaving any residue when being removed) could be prepared by regulating the length of chain and content of a cross-linking agent containing alkylene oxide group.

The removable acrylic pressure sensitive adhesive of the present invention comprises:

(A) 70-96.5 weight % of (meth)acrylic acid ester monomer having $C_1$-$C_{14}$ alkyl group;

(B) 0.5-27 weight % of one or more functional group containing monomers selected from the group consisting of carboxyl group containing monomer, hydroxyl group containing monomer, epoxy group containing monomer, vinyl ester group containing monomer and cyano group containing monomer; and (C) 0.6-3 weight % of a cross linking agent having 5-13 alkylene oxide groups and acrylate group or vinyl group, in 100 weight % of the monomer and the cross linking agent.

The (meth)acrylic acid ester monomer of (A) is a single compound or a mixture comprising at least two compounds selected from the group consisting of methyl(meth)acrylate, ethyl(meth)acrylate, propyl(meth)acrylate, butyl(meth)acrylate, 2-ethylhexyl(meth)acrylate, octyl(meth)acrylate and lauryl(meth)acrylate.

The (meth)acrylic acid ester monomer of (A) is preferably included by 70-96.5 weight % in 100 weight % of the total monomer and the cross-linking agent. If the content is less than 70 weight %, initial adhesiveness is not satisfactory. If the content is more than 96.5 weight %, interfacial failure is observed between the substrate sheet and adhesive when the pressure sensitive adhesive sheet is removed, leaving residues.

One or more compounds selected from the group consisting of the functional group containing monomers of (B) are preferably epoxy group containing monomer or cyano group containing monomer or a mixture thereof, and vinyl ester group containing monomer can also be included.

The carboxyl group containing group of (B) is exemplified by anhydrous maleic acid, fumaric acid, crotonic acid, itaconic acid, acrylic acid, and methacrylic acid. The hydroxyl group containing monomer is exemplified by hydroxyethyl (meth)acrylate, hydroxypropyl(meth)acrylate, hydroxybutyl (meth)acrylate, hydroxyhexyl(meth)acrylate, hydroxyoctyl (meth)acrylate, hydroxylauryl(meth)acrylate, and hydroxypropyleneglycol(meth)acrylate. The epoxy group containing monomer is exemplified by glycidylmethacrylate and allylglycidylether. The vinylester group containing monomer is exemplified by vinyl acetate, vinyl propionate, vinyl laurylate, and vinyl pyrrolidone. The cyano group containing monomer is exemplified by acrylonitrile and methacrylonitrile.

One or more the functional group containing monomers of (B) are preferably included by 0.5-27 weight %, more preferably 3-25 weight %, and most preferably 5-20 weight % in 100 weight % of the monomers and the cross-linking agent. In this range, cohesive force of the resin is good enough to secure dimensional stability and removability, and glass transition temperature (Tg) is also proper not to be limited in outdoor use.

The cross-linking agent of (C) plays a role in endowing cohesiveness, dimensional stability and removability, and preferably contains 5-13 alkylene oxide groups and more preferably 6-12 alkylene oxide groups. In that case, adhesiveness at room temperature and under aging atmosphere, dimensional stability and removability are all excellent.

As referred, the number of alkylene oxide group indicates the mean number of the alkylene oxide group included in the cross-linking agent used, and it is presented as average addition mol number of alkylene oxide in the following examples.

If a cross-linking gent having less than 5 alkylene oxide groups is used, the adhesive becomes unnecessarily hard, reducing adhesive property. If a cross-linking agent having more than 13 alkylene oxides is used, the adhesive becomes unnecessarily soft and flexible, resulting in interfacial failure between the template sheet and adhesive during removal with leaving residues.

The cross-linking agent of (C) is preferably polyethylene glycol diacrylate (PEGDA), polypropylene glycol diacrylate (PPGDA) or a mixture thereof.

The content of the cross-linking gent of (C) is preferably 0.6-3 weight %, and more preferably 0.9-2.1 weight %. If the content is in that range, adhesiveness at room temperature and under aging atmosphere, dimensional stability and removability are all excellent.

The removable acrylic pressure sensitive adhesive has glass transition temperature (Tg) of −55 to −35° C., more preferably −55 to −40° C. If the glass transition temperature is in that range, workability at low temperature, which is necessary for outdoor use, and adhesiveness at low temperature are secured.

The removable acrylic pressure sensitive adhesive of the present invention is prepared by adding 0.5-3 weight part of a polymerization initiator to 100 weight part of the monomer mixture composed of (A) 70-96.5 weight % of (meth)acrylic acid ester monomer having $C_1$-$C_{14}$ alkyl group; (B) 0.5-27 weight % of one or more monomers selected from the group consisting of functional group containing monomers such as carboxyl group containing monomer, hydroxyl group containing monomer, epoxy group containing monomer, vinyl ester group containing monomer and cyano group containing monomer; and (C) 0.6-3 weight % of a cross linking agent having 5-13 alkylene oxide groups and acrylate group or vinyl group in 100 weight % of the total monomer and cross linking agent.

The polymerization initiator is preferably ammonium or persulfate salt of alkali metal or hydrogen peroxide. If one of these is used, adhesiveness at room temperature and under aging atmosphere, dimensional stability and removability are all excellent.

The polymerization initiator is preferably added to 100 weight % of the total monomer and cross-linking agent by 0.2-5 weight part and more preferably by 0.5-3 weight part.

The emulsifier used for the preparation of the said removable acrylic pressure sensitive adhesive of the present invention can be one or more compounds selected among all the emulsifiers used for general emulsion polymerization, which is exemplified by anionic emulsifiers such as sodium lauryl sulfate, ammonium lauryl sulfate, sodium dodecylbenzene sulfonate, sodium alkylarylnaphthalene sulfate, sodium dodecylphenyloxide sulfate, sodium polyoxyethylenealkylether sulfate, sodium polyoxyethylenealkylphenylether sulfate and sodium dioctylsulfosuccinate; and non-ionic emulsifiers such as polyoxyethylenenonylphenylether, polyoxyethylenealkylether, polyoxyethylenealkylphenylether, polyoxyethylene fatty acid ester and polyoxyethylene-polyoxypropylene block polymer.

The emulsifier is preferably included in 100 weight part of the total monomer and cross-linking agent by 0.5-3 weight part.

The prepared removable acrylic pressure sensitive adhesive of the present invention can be used as a major component of an adhesive and if necessary it can be neutralized with an alkali material and then used as a major component of an adhesive.

The alkali material herein is an inorganic material such as hydroxide, chloride and carbonate of monovalent or divalent metal; or ammonia; or organic amine.

The removable acrylic pressure sensitive adhesive can additionally include, if necessary, a tackifier, a defoaming agent, a wetting agent, a thickener, a dispersing agent, a UV stabilizer, an antioxidant, or a filler.

The pressure sensitive pressure sensitive adhesive sheet of the present invention is characteristically coated with the removable acrylic pressure sensitive adhesive on one side or both sides of the substrate sheet.

The pressure sensitive adhesive coated thereon is preferably 20-30 μm thick. When the adhesive is coated in that thickness, adhesiveness with the substrate sheet and dimensional stability of the substrate sheet are satisfactory.

The substrate sheet is not limited, but preferably PVC, PET, PP, PE or a paper sheet. More particularly, PVC sheet herein is the preferable one in 50-200 μm in thickness prepared by casting or calendering.

To protect the adhesive layer and increase storage property of a product and secure smoothness, a release paper can be laminated on the adhesive layer. At this time, the thickness of such release paper is preferably 100-200 μm.

The advantages, features and aspects of the invention will become apparent from the following description of the embodiments, which is set forth hereinafter.

EXAMPLES

Example 1

<Preparation of Acrylic Pressure Sensitive Adhesive>

To a 2 L glass reactor equipped with stirring blade, thermometer, nitrogen gas injection tube and reflux condenser were added 200 g of distilled water and 1.2 g of sodium alkylarylnapthalene sulfonate (SANS) as a surfactant. Air inside of the reactor was replaced with nitrogen with stirring and the temperature therein was raised to 70° C. under nitrogen.

To the reactor was added a polymerization initiator (0.4 g of ammonium persulfate dissolved in 8 g of distilled water). Pre-emulsion emulsified by mixing a solution comprising 520 g of butylacrylate (BA), 152 g of 2-ethylhexylacrylate (2-EHA), 40 g of acrylonitrile (AN), 80 g of ethylacrylate (EA) and 8 g of polyethyleneglycoldiacrylate (average addition mol number of ethyleneoxide 9, EO molecular weight 400) and another solution comprising 328 g of distilled water and 6.8 g of sodium alkylarylnaphthalene sulfate (surfactant) was loaded thereto for 4 hours, followed by reaction. 7.4 g of ammonium persulfate was dissolved in 149 g of distilled water, and this solution was loaded simultaneously with the pre-emulsion for 4 hours.

Upon completion of loading, 0.2 g of ammonium persulfate was dissolved in 3.2 g of distilled water, and this solution was loaded thereto at a time. The mixture stood for 1 hour at 80° C. to wait for non-reacted monomers to be reacted completely. The mixture was cooled down to room temperature to give an acrylic pressure sensitive adhesive.

The prepared acrylic pressure sensitive adhesive was neutralized with 28% ammonia aqueous solution to adjust pH to 7-8.

Preparation of Pressure Sensitive Adhesive Sheet

The neutralized acrylic pressure sensitive adhesive was applied on a release paper, which was dried at 110° C. for 2 minutes. Then, one side of a vinylchloride resin sheet was laminated with the release paper regularly, resulting in the preparation of an pressure sensitive adhesive sheet with 20 μm in thickness having the structure of release paper-adhesive layer-substrate sheet.

Example 2

An pressure sensitive adhesive sheet was prepared by the same manner as described in Example 1 except that 12 g of polyethyleneglycoldiacrylate (average addition mol number of ethyleneoxide 9, EO molecular weight 400) was added.

Example 3

An pressure sensitive adhesive sheet was prepared by the same manner as described in Example 1 except that 16 g of polyethyleneglycoldiacrylate (average addition mol number of ethyleneoxide 9, EO molecular weight 400) was added.

Example 4

An pressure sensitive adhesive sheet was prepared by the same manner as described in Example 1 except that 8 g of polypropyleneglycoldiacrylate (average addition mol number of propylene oxide 7, PO molecular weight 400) was added instead of polyethyleneglycoldiacrylate (average addition mol number of ethyleneoxide 9).

Comparative Example 1

An pressure sensitive adhesive sheet was prepared by the same manner as described in Example 1 except that 4.0 g of polyethyleneglycoldiacrylate (average addition mol number of ethyleneoxide 9, EO molecular weight 400) was added.

Comparative Example 2

An pressure sensitive adhesive sheet was prepared by the same manner as described in Example 1 except that 8.0 g of polyethyleneglycoldiacrylate (average addition mol number of ethyleneoxide 4.5, EO molecular weight 200) was added instead of polyethyleneglycoldiacrylate (average addition mol number of ethyleneoxide 9).

Comparative Example 3

An pressure sensitive adhesive sheet was prepared by the same manner as described in Example 1 except that 8.0 g of polyethyleneglycoldiacrylate (average addition mol number of ethyleneoxide 13.5, EO molecular weight 600) was added instead of polyethyleneglycoldiacrylate (average addition mol number of ethyleneoxide 9).

Comparative Example 4

An pressure sensitive adhesive sheet was prepared by the same manner as described in Example 1 except that 1.6 g of polyethyleneglycoldiacrylate (average addition mol number of ethyleneoxide 9, EO molecular weight 400) was added.

Comparative Example 5

An pressure sensitive adhesive sheet was prepared by the same manner as described in Example 1 except that 32 g of polyethyleneglycoldiacrylate (average addition mol number of ethyleneoxide 9, EO molecular weight 400) was added.

Comparative Example 6

An pressure sensitive adhesive sheet was prepared by the same manner as described in Example 1 except that 8.0 g of hexanedioldiacrylate (EDDA) was added instead of polyethyleneglycoldiacrylate (average addition mol number of ethyleneoxide 9).

Comparative Example 7

An pressure sensitive adhesive sheet was prepared by the same manner as described in Example 1 except that 8.0 g of allylmethacrylate (AMA) was added instead of polyethyleneglycoldiacrylate (average addition mol number of ethyleneoxide 9).

Average addition mol number (N) of alkylene oxide included in the cross-linking agent was calculated by the following mathematic formula 1.

$$N = AO \text{ molecular weight} / \text{unit } AO \text{ molecular weight} \quad \text{Mathematic Formula 1}$$

The AO molecular weight herein indicates number-average molecular weight of alkylene oxide included in the cross-linking agent (for example, EO molecular weight is number-average molecular weight of ethylene oxide included in the cross-linking agent), and the unit AO molecular weight indicates molecular weight of one alkylene oxide group (for example, unit EO molecular weight is 44).

Experimental Examples

Properties of the pressure sensitive adhesive sheets prepared in Examples 1-4 and Comparative Examples 1-7 are measured by the following methods and the results are shown in Table 1.

1) Measurement of peel strength at room temperature:

The prepared pressure sensitive adhesive sheet was tested for peel strength at room temperature and under aging condition by the method of JIS Z 0237. Particularly, three samples were prepared (2.5 cm×10 cm), which were attached on stainless steel surface, on which 2 kg roller was round-tripped 5 times at the speed of 300 mm/min. After storing at room temperature for a day, 180 degree-peeling was performed at the speed of 5 mm/sec, during which peel strength was measured.

2) Measurement of aging-dependent peel strength:

Aging-dependent peel strength is an index for evaluating the decrease of adhesiveness of an pressure sensitive adhesive sheet according to long-term storage. The prepared pressure sensitive adhesive sheet was left in a 70° C. oven for 3 days to induce aging. Then, the sheet was cooled down at room temperature for 30 minutes, which was prepared as three samples (2.5 cm×10 cm). Those samples were attached on stainless steel surface, on which 2 kg roller was round-tripped 5 times at the speed of 300 mm/min. After storing at room temperature for a day, 180 degree-peeling was performed at the speed of 5 mm/sec, during which peel strength was measured.

3) Measurement of dimensional stability (shrinkage);

The prepared adhesive was cut into 18 cm×18 cm samples, which were laminated on aluminum surface with care not to generate air-bubbles thereon. Cross-cut was made in the center of the pressure sensitive adhesive sheet and the size (or interval) of the cross-cut was measured with vernier calipers (the size before storing). Then, the pressure sensitive adhesive sheet with cross-cut was stored in a 80° C. oven for a day and then cooled down at room temperature. The size of the cross-cut was measured (the size after storing). Dimensional shrinkage (%) was calculated by the following mathematical formula 2 based on the above measurements. As the gap of the cross-cut became narrow, after storing, which meant that dimensional shrinkage was lower, dimensional stability of the sheet was increased. Our target shrinkage was up to 0.5%.

$$\text{Dimensional shrinkage (\%)} = \{(\text{dimension before storing}) - (\text{dimension after storing})\} / \text{dimension before storing} \times 100 \quad \text{Mathematical Formula 2}$$

4) Measurement of polluting property:

As an index for evaluating removability of an adhesive, polluting property was measured. The prepared pressure sensitive adhesive sheet was prepared as 2.5 cm×10 cm samples (three), which were attached on stainless steel surface. Then, the steel was stored in a 70° C. oven for 3 days, and then taken out to stay at room temperature for one day. Peeling was performed at the speed of 5 mm/sec and residues remaining on the stainless steel were observed. Our target was no residue remaining.

TABLE 1

| | Room temperature peel strength (kgf/in) | Aging dependent peel strength (kgf/in) | Shrinkage (%) (standard: less than 0.5%) | Polluting property (residue %) |
|---|---|---|---|---|
| Example 1 | 1.30 | 1.05 | 0.4 | 0 |
| Example 2 | 1.18 | 1.07 | 0.3 | 0 |
| Example 3 | 1.14 | 1.04 | 0.3 | 0 |
| Example 4 | 1.21 | 1.02 | 0.5 | 0 |
| Comparative Example 1 | 1.28 | 1.21 | 1.0 | 30 |
| Comparative Example 2 | 1.31 | 1.12 | 0.9 | 0 |
| Comparative Example 3 | 1.15 | 0.97 | 0.4 | 100 |
| Comparative Example 4 | 1.43 | 1.27 | 1.6 | 70 |
| Comparative Example 5 | 0.99 | 0.89 | 0.2 | 0 |
| Comparative Example 6 | 0.91 | 0.56 | 0.2 | 0 |
| Comparative Example 7 | 0.78 | 0.42 | 0.1 | 0 |

As shown in Table 1, the acrylic pressure sensitive adhesives containing the cross-linking gent polyethyleneglycoldiacrylate (average addition mol number of alkylene oxide: 5-13) at the concentration of 0.6-3 weight % (Examples 1-4) were confirmed to have excellent peel strength at room temperature and under aging condition, dimensional stability and removability, compared with other adhesives having the cross-linking agent at the concentration out of that range (Comparative Examples 1-5) or using the cross-linking agent shorter than the above (Comparative Examples 6-7).

Weatherability indicating adhesive properties of an pressure sensitive adhesive sheet maintained for a long term was calculated by change rate of adhesiveness (Y) calculated by the following mathematical formula 3. As the change rate was lower, weatherability was greater.

$$Y = \{(Fb - Fa)/Fa\} \times 100 \quad \text{Mathematical Formula 3}$$

Herein, Y indicates change rate of adhesiveness (−) according to the decrease of aging dependent adhesiveness compared with adhesiveness at room temperature, Fb indicates aging dependent adhesiveness (kgf/in), and Fa indicates adhesiveness at room temperature (kgf/in).

As calculated by mathematical formula 3, when a long cross-linking agent such as polyalkyleneglycoldiacrylate was included (Examples 1-4), change rate of adhesiveness was approximately 20%, and when a short cross-linking agent such as hexanedioldiacrylate and allylmethacrylate was included (Comparative Examples 6-7), change rate of adhesiveness was 38% and 46% respectively. The above results indicate that a comparatively long cross-linking agent such as polyalkyleneglycoldiacrylate is added (Examples 1-4), the sheet can have excellent weatherability, compared with the sheet prepared by using a shorter cross-linking agent (Comparative Examples 6-7).

The present invention provides a removable acrylic pressure sensitive adhesive which is a pro-environmental water based adhesive having excellent dimensional stability and adhesiveness at room temperature and under aging condition and as high adhesive power as a permanent adhesive and at the same time excellent removability, so as to be widely used for pressure sensitive adhesive sheets for outdoor/indoor advertisement, automobile, printing, decorating, etc, and a method of preparing the same.

While the present invention has been described with respect to the specific embodiments, it will be apparent to those skilled in the art that various changes and modifications may be made without departing from the spirit and scope of the invention as defined in the following claims.

What is claimed is:

1. An acrylic pressure sensitive removable adhesive comprising an acrylic copolymer formed by copolymerizing a mixture comprising:
   (A) 70-96.5 weight % of (meth)acrylic acid ester monomer having C1-C14 alkyl group;
   (B) 0.5-27 weight % of one or more functional group containing monomers selected from the group consisting of epoxy group containing monomer, and cyano group containing monomer; and
   (C) 1.0-1.98 weight % of a cross-linking agent having 5-13 alkylene oxide groups and acrylate group or vinyl group, based on 100 weight % of the monomers and the cross-linking agent;
   wherein:
   (i) said pressure sensitive adhesive is removable from a substrate to which it has been adhered without leaving residue; and
   (ii) the number average molecular weight of alkylene oxide groups included in the cross-linking agent is 230-572.

2. The acrylic pressure sensitive adhesive according to claim 1, wherein the (meth)acrylic acid ester monomer is one or more compounds selected from the group consisting of methyl(meth)acrylate, ethyl(meth)acrylate, propyl(meth)acrylate, butyl(meth)acrylate, 2-ethylhexyl (meth)acrylate, octyl(meth) acrylate and lauryl(meth) acrylate.

3. The acrylic pressure sensitive adhesive according to claim 1, wherein the one or more functional group containing monomers are selected from the group consisting of glycidylmethacrylate, allylglycidylether, acrylonitrile and methacrylonitrile.

4. The acrylic pressure sensitive adhesive according to claim 1, wherein the acrylic pressure sensitive adhesive comprises the one or more functional group containing monomers in an amount of from 5-20 weight %.

5. The acrylic pressure sensitive adhesive according to claim 1, wherein the cross-linking agent is one or more compounds selected from the group consisting of polyethyleneglycoldiacrylate and polypropyleneglycoldiacrylate.

6. The acrylic pressure sensitive adhesive according to claim 1, wherein the removable acrylic pressure sensitive adhesive has glass transition temperature (Tg) of −55 to −35° C.

7. The acrylic pressure sensitive adhesive according to claim 1, wherein shrinkage of the acrylic pressure sensitive adhesive is up to 0.5% after 24 hours of storing at 80° C. which is calculated by the following mathematical formula 2, $$\text{Dimensional shrinkage (\%)} =\{(\text{dimension before storing}) - (\text{dimension after storing})\}/\text{dimension before storing} \times 100 \quad \text{Mathematical Formula 2.}$$

8. The acrylic pressure sensitive adhesive according to claim 1, wherein change rate of adhesiveness (Y) of the acrylic pressure sensitive adhesive is up to 20%, which is calculated by the following mathematical formula 3, $$Y=(Fb-Fa)/Fa\times 100 \quad \text{Mathematical Formula 3}$$

wherein, Y indicates change rate of adhesiveness (−) according to the decrease of aging dependent adhesiveness compared with adhesiveness at room temperature, Fa indicates adhesiveness at room temperature (kgf/in), and Fb indicates aging dependent adhesiveness (kgf/in).

9. A method of preparing an acrylic pressure sensitive adhesive comprising:
   (a) preparing a monomer mixture comprising (A) 70-96.5 weight % of (meth)acrylic acid ester monomer having C1-C14 alkyl group; (B) 0.5-27 weight % of one or more functional group containing monomers selected from the group consisting of epoxy group containing monomer, and cyano group containing monomer; and (C) 0.6-3 weight % of a cross-linking agent having 5-13 alkylene oxide groups and acrylate group or vinyl group; and
   (b) adding 0.5-3 weight part of a polymerization initiator and 0.5-3 weight part of an emulsifier into 100 weight part of the monomer mixture;
   wherein:
   (i) said pressure sensitive adhesive is removable from a substrate to which it has been adhered without leaving residue; and
   (ii) the number average molecular weight of alkylene oxide groups included in the cross-linking agent is 230-572.

10. The method of preparing an acrylic pressure sensitive adhesive according to claim 9, wherein the polymerization initiator is persulfate salts of ammonium or alkali metals, or hydrogen peroxide.

11. A pressure sensitive adhesive sheet, on which the acrylic pressure sensitive adhesives of claim 1 is coated on one side or both sides of a substrate.

12. The pressure sensitive pressure sensitive adhesive sheet according to claim 11, wherein the substrate is PVC, PET, PP, PE or a paper sheet.

13. An acrylic pressure sensitive, removable adhesive comprising an acrylic copolymer formed by emulsion copolymerizing a mixture comprising:
   (A) 70-96.5 weight % of (meth)acrylic acid ester monomer having C1- C14 alkyl group;
   (B) 0.5-27 weight % of one or more functional group containing monomers selected from the group consisting of epoxy group containing monomer, and cyano group containing monomer; and
   (C) 0.6-3 weight % of a cross linking agent having 5-13 alkylene oxide groups and acrylate group or vinyl group, based on 100 weight % of the monomers and the cross linking agent;
   wherein
   (i) said pressure sensitive adhesive is removable from a substrate to which it has been adhered without leaving residue; and
   (ii) the number average molecular weight of alkylene oxide groups included in the cross-linking agent is 230- 572.

* * * * *

UNITED STATES PATENT AND TRADEMARK OFFICE
CERTIFICATE OF CORRECTION

PATENT NO. : 8,822,028 B2  Page 1 of 1
APPLICATION NO. : 12/831375
DATED : September 2, 2014
INVENTOR(S) : Kong-ju Song et al.

It is certified that error appears in the above-identified patent and that said Letters Patent is hereby corrected as shown below:

In the claims

Column 10, line 38, delete the second instance of "pressure sensitive".

Signed and Sealed this
Sixteenth Day of February, 2016

Michelle K. Lee
*Director of the United States Patent and Trademark Office*